US008532654B2

(12) United States Patent
Richardson et al.

(10) Patent No.: US 8,532,654 B2
(45) Date of Patent: Sep. 10, 2013

(54) DETECTING SUBSCRIBER INPUT VIA A WIRELESS COMMUNICATION DEVICE FOR INITIATING NETWORK PROVISIONING OF SUCH DEVICE

(75) Inventors: Simon Richardson, Alpharetta, GA (US); Louis Ascoli, Mukilteo, WA (US); Chris Bryant, Duvall, WA (US); James Jackson, Austin, TX (US); Eric Morris, Snohommish, WA (US); Melanie Swierstra, Bothell, WA (US); Qun Wei, Redmond, WA (US); David Wrobleski, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 40 days.

(21) Appl. No.: 13/292,305

(22) Filed: Nov. 9, 2011

(65) Prior Publication Data
US 2013/0115931 A1   May 9, 2013

(51) Int. Cl.
*H04W 60/00* (2009.01)
*H04W 60/04* (2009.01)
*H04W 8/26* (2009.01)
*H04W 4/02* (2009.01)
*H04L 29/08* (2006.01)

(52) U.S. Cl.
USPC ............... 455/435.1; 455/422.1; 455/414.1; 455/415; 455/419

(58) Field of Classification Search
USPC ...................................... 455/435.1
See application file for complete search history.

(56) References Cited

U.S. PATENT DOCUMENTS

| 6,487,403 | B2 | 11/2002 | Carroll | |
|---|---|---|---|---|
| 7,305,090 | B1* | 12/2007 | Hayes et al. | 380/249 |
| 2003/0013434 | A1* | 1/2003 | Rosenberg et al. | 455/414 |
| 2004/0242209 | A1* | 12/2004 | Kruis et al. | 455/414.1 |
| 2010/0234003 | A1* | 9/2010 | Theppasandra | 455/415 |
| 2011/0032869 | A1 | 2/2011 | Natan et al. | |
| 2011/0034161 | A1* | 2/2011 | Kruis et al. | 455/419 |
| 2011/0098030 | A1* | 4/2011 | Luoma | 455/419 |

OTHER PUBLICATIONS

Jahangir Mohammed, "Jasper Wireless: Automated Provisioning Drives Future of Machine Communications." Dec. 10, 2007, Last accessed Feb. 29, 2012, 6 pages.

* cited by examiner

*Primary Examiner* — Timothy Pham
(74) *Attorney, Agent, or Firm* — Turocy & Watson, LLP

(57) ABSTRACT

Methods, systems, and apparatus for detecting subscriber input via a wireless communication device for initiating network provisioning of the wireless communication device are presented herein. A method can include receiving, via an interface of a wireless communication device, a first input from a subscriber of a wireless service associated with the wireless communication device; sending, by the wireless communication device based on the first input from the subscriber, a request for provisioning the wireless communication device via a wireless network associated with the wireless service; and outputting, via the interface of the wireless communication device, a first message including a condition for the provisioning the wireless communication device via the wireless network based on the request. In an example, the method can further include receiving, based on the request, the condition from a component of the wireless network.

20 Claims, 11 Drawing Sheets

DETECTING SUBSCRIBER INPUT VIA A WIRELESS COMMUNICATION DEVICE FOR INITIATING NETWORK PROVISIONING OF SUCH DEVICE

TECHNICAL FIELD

This disclosure relates generally to detecting subscriber input via a wireless communication device for initiating network provisioning of such device.

BACKGROUND

Wireless devices, e.g., cellular based devices, are ubiquitous; and various types of communication can be facilitated with such devices. However, conventional wireless device technologies do not provide for effective provisioning of wireless communication devices since such technologies tend to require some degree of inflexible, in-store provisioning of such devices at the time of purchase of such devices.

The above-described deficiencies of today's wireless communication technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject innovations. Its sole purpose is to present some concepts of the disclosed subject matter in a simplified form as a prelude to the more detailed description presented later.

To correct for the above-identified and other drawbacks of conventional wireless communication technologies, various systems, methods, and apparatus described herein provide for detecting subscriber input via a wireless communication device for initiating provisioning of the wireless communication device, e.g., during a time and at a location determined by the subscriber. For example, a method can receive, via an interface of a wireless communication device, a first input from a subscriber of a wireless service associated with the wireless communication device. Further, the method can send, by the wireless communication device based on the first input from the subscriber, a request for provisioning the wireless communication device via a wireless network associated with the wireless service. Moreover, the method can output, via the interface of the wireless communication device, a first message including a condition for the provisioning the wireless communication device via the wireless network based on the request.

In one example, the method can detect, by the wireless communication device, whether an application associated with the wireless service is being initiated. In an example, the application can be associated with communicating, displaying, etc. messaging content, via the wireless communication device, which can be associated with the wireless service. In another example, the method can receive the first input based on the application being initiated, e.g., opened, selected, started, etc. In yet another example, the first input can be based on a power up, etc. of the wireless communication device, for example, which is associated with a first use of the wireless communication device after purchase of the wireless communication device by the subscriber.

In another example, the method can receive, based on the request, the condition from a component of the wireless network. In an example, the component can be associated with a wireless service provider associated with the wireless service. Further, the component can communicatively coupled to data storage component(s) including decision table(s) and/or information associated with subscriber(s) of wireless service(s) provided by the wireless network. Furthermore, the condition can be associated with term(s) and/or condition(s) associated with the wireless service(s) provided by the wireless network.

In yet another example, the method can receive, via the interface of the wireless communication device, a second input from the subscriber based on the first message. For example, the second input can be associated with the term(s) and/or the condition(s) being accepted by the subscriber of the wireless service associated with the wireless communication device. In another example, the second input can be associated with the term(s) and/or the condition(s) being denied by the subscriber.

In one example, the method can send, by the wireless communication device, information associated with the second input to the component of the wireless network. Further, the method can receive, by the wireless communication device via the wireless network, data based on the information; and perform, by the wireless communication device, at least a portion of the wireless service based on the data. For example, the data can include configuration information that the wireless communication device can utilize to perform at least a portion of the wireless service and/or other service(s) via the wireless network.

In another example, the method can display, via the interface of the wireless communication device, the messaging content associated with the wireless service.

In an example, a system can include a data storage component configured to store, via a data storage device, information associated with a subscriber of a wireless service that is associated with a wireless network. For example, the data storage device can be associated with storage component(s) including decision table(s) and/or information associated with subscriber(s) of wireless service(s) provided by a wireless network.

Further, the system can include a provisioning component configured to receive from the subscriber, via a wireless communication device associated with the wireless service, a request to provision the wireless communication device via the wireless network. Furthermore, the provisioning component can be configured to send a condition associated with the request to the wireless communication device. For example, the condition can be associated with term(s) and/or condition(s) associated with the wireless service, e.g., provided by the wireless network.

In another example, the provisioning component can be further configured to receive a message from the wireless communication device indicating whether the condition was accepted via the wireless communication device. Further, the data storage component can be further configured to modify the information based on the message, e.g., the data storage component can store data indicating that the subscriber accepted, or rejected, the term(s) and/or the conditions(s).

In yet another example, the system can include a service component configured to provide at least a portion of the wireless service via the wireless communication device based on the message. For example, the service component can further be configured to communicate messaging content to the wireless communication device based on the device information, e.g., such messaging content can be displayed by the wireless communication device as threaded messages based on a time such messages are received by the wireless communication device.

In an example, the service component can include a network component configured to assign a phone number to communication devices including the wireless communication device. Further, the service component can further be configured to provide the portion of the wireless service via the respective communication devices based on the phone number.

In one example, the service component can further be configured to provide the portion of the wireless service via an internet based interface of a device of the respective communication devices. For example, the internet based interface can include a web-browser displayed by the device that can display messaging content.

In another example, the service component can include an intelligent reply component configured to: detect a missed call associated with the phone number; and route a return call to a device of the communication devices based on a parameter associated with the missed call. For example, the parameter can include a time of day, a day of week, a location of the device, a status of the device, etc.

In yet another example, the service component can include a translation code component configured to route a communication, via the wireless service, from/to the wireless communication device to/from an other communication device based on a short code associated with the communication. For example, the translation code component can route the communication to a web-based interface based on the short code associated with, e.g., a short message service (SMS) message or a multimedia message service (MMS) message.

In an example, an apparatus can include an interface component configured to receive a first input from a subscriber of a wireless service associated with a wireless network. Further, the apparatus can include a registration component configured to: communicate, based on the input from the subscriber, a request to provision the apparatus via the wireless network. Furthermore, the registration component can be configured to receive a condition associated with the request via the wireless network. In one example, the condition can be associated with term(s) and/or condition(s) associated with the wireless service, e.g., provided by the wireless network.

In another example, the interface component can be configured to output a message including the condition, e.g., including text describing the term(s) and/or the condition(s).

In yet another example, the interface component can further be configured to receive a second input from the subscriber based on the message. Further, the registration component can further be configured to communicate information associated with the second input to a component of the wireless network. For example, the information can indicate an acceptance or a rejection of the condition.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
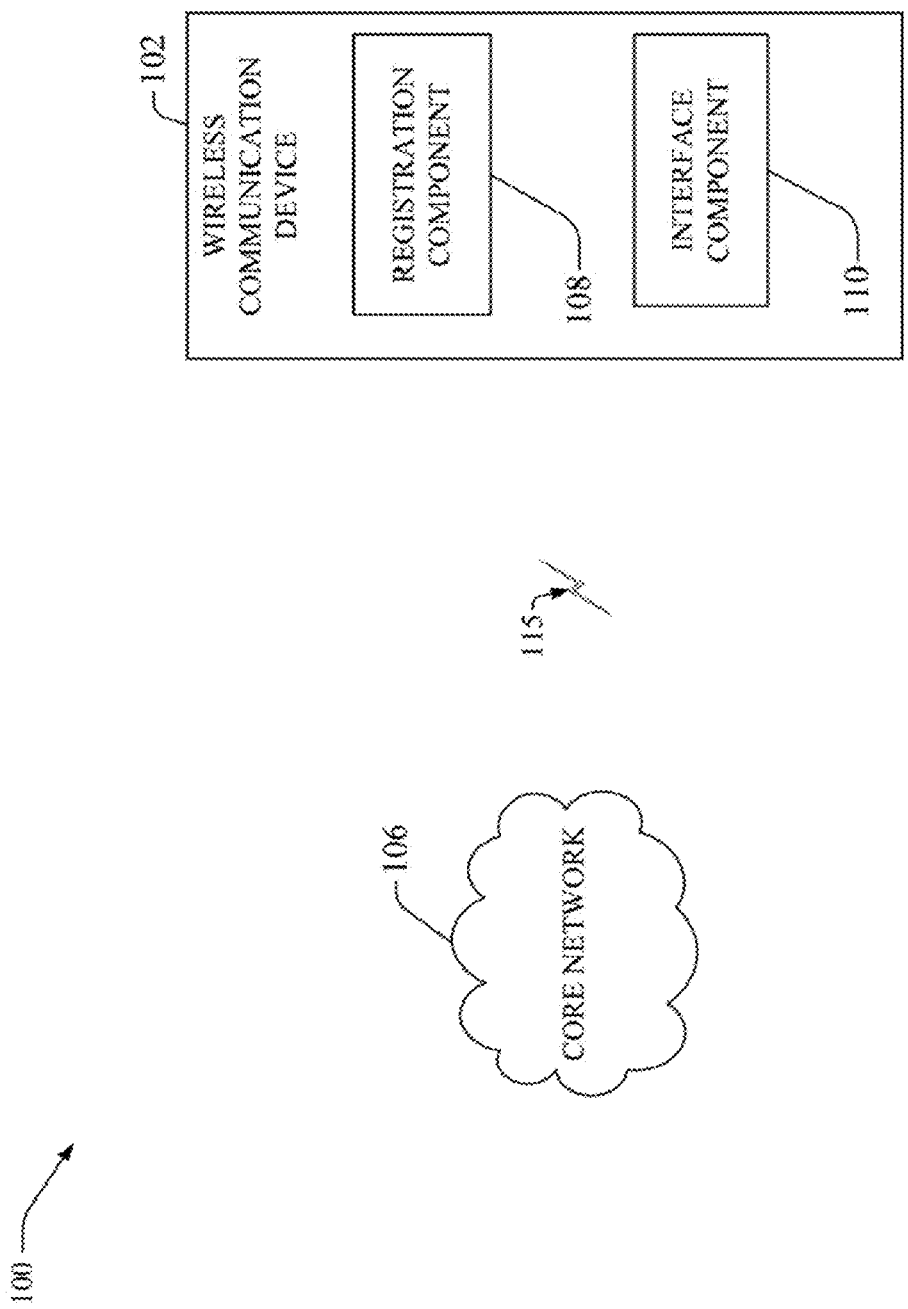
FIG. 1 illustrates a block diagram of a communication environment, in accordance with various embodiments described herein.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Aspects, features, and/or advantages of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), Near Field Communication (NFC), Wibree, Wi-Fi Direct™, etc.

Additionally, one or more embodiments described herein can include legacy telecommunication technologies, e.g., plain old telephone service (POTS). Further, selections of a radio technology, or radio access technology, can include second generation (2G), third generation (3G), and fourth generation (4G) evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

As used in this application, the terms "component," "module," "system," "interface," and the like, are generally intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium associated with the machine. Such instructions, when executed by the machine, can cause the machine to perform the operations described. Additionally, the systems and processes can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive); and/or a virtual device that emulates a storage device and/or any of the above computer-readable media.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," and similar terminology refer to a wireless device, or wireless communication device, which is at least one of (1) utilized by a subscriber of a wireless service, or communication service, to receive and/or convey data associated with voice, video, sound, and/or substantially any data-stream or signaling-stream; or (2) utilized by a subscriber of a voice over internet protocol (VoIP) service that delivers voice communications over internet protocol (IP) networks such as the Internet or other packet-switched networks. Further, the foregoing terms are utilized interchangeably in the subject specification and related drawings.

In one example, the subscriber of the wireless service (or the subscriber of the VoIP service) can be a customer of a wireless service provider who, e.g., received, purchased, etc. the wireless communication device, e.g., via a new wireless service activation associated with the wireless service provider; a device upgrade associated with the wireless service provider, etc.

In another example, the subscriber can be an existing subscriber associated with the wireless service provider. Further, the existing subscriber can upgrade the wireless device, e.g., to provide the wireless service, by installing a new subscriber identity module (SIM) card into the wireless device, e.g., the new SIM card related to the device upgrade associated with the wireless service provider.

In yet another example, the subscriber can be a customer of a wireless service plan associated with the wireless service provider. As such, the wireless device can be provisioned, e.g., at a retail establishment in response to the wireless device being purchased at the retail establishment, to provide basic, e.g., calling, services. In an aspect (see e.g. system 100 below), input by the subscriber can be detected via the wireless device, e.g., at a time and location selected by the subscriber, for initiating network provisioning of the wireless communication device, e.g., to provide extended services, or services different from the basic calling services, based on the wireless service plan.

A communication network for systems described herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of a communication network can include any suitable data packet-switched or combination data packet/circuit-switched communication network, wired or wireless IP network such as a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems, methods, and/or apparatus disclosed herein can include a wireless communication device, a mobile device, a mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone, a portable computer, or any suitable combination thereof. Specific examples of a mobile device can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process, and/or combination device that can store digital and/or switched information (e.g., server, data store component, data store component, or the like).

As mentioned, various non-limiting embodiments of systems, methods, and apparatus are provided for detecting subscriber input via a wireless communication device for initiating network provisioning of the wireless communication device.

Now referring to FIG. 1, a communication environment 100 that facilitates detecting subscriber input via a wireless communication device for initiating network provisioning of the wireless communication device is illustrated, in accordance with various embodiments described herein. In an aspect, communication environment 100 can include wireless communication device 102 communicatively coupled to core network 106. Wireless communication device 102 can include software, hardware, functionality, and/or structure(s) of communication device 200 described below (and vice versa). Further, wireless communication device 102 can be communicatively coupled to core network 106 via wireless link 115. Wireless link 115 can be an over-the-air wireless link 115 comprising a downlink (DL) and an uplink (UL) (both not shown) that can utilize a predetermined band of radio frequency (RF) spectrum associated with, e.g., GSM, 3GPP UMTS, etc. Accordingly, wireless communication device 102 can be a GSM and/or 3GPP UMTS mobile phone, etc.

In another aspect, wireless communication device 102 can include a registration component 108 and an interface component 110 for detecting subscriber input for initiating network provisioning of wireless communication device 102. As such, wireless communication device can enable the subscriber to initiate provisioning of wireless communication device 102 via core network 106, e.g., during a time and at location directed by the subscriber, for example, after the subscriber purchases wireless communication device 102.

In various aspects, interface component 110 can be communicatively coupled to registration component 108 for providing and/or enabling communication to/from wireless communication device 102; for accessing and/or storing information within wireless communication device 102; for controlling wireless communication device 102; and/or for providing/receiving information input/output to/from wireless communication device 102, e.g., for detecting subscriber input for initiating network provisioning of wireless communication device 102 via registration component 108.

In an aspect, interface component 110 can be configured to receive a first input from a subscriber of a wireless service associated with core network 106, e.g., a wireless network. In one aspect, the first input can received by interface component 110 based on, or associated with, the subscriber powering up wireless communication device 102, e.g., during a first use of wireless communication device 102, for example, after the subscriber purchases wireless communication device 102. In another aspect, the first input can be received by interface component 110 based on, or associated with, an application being initiated, e.g., opened, selected, started, etc. from wireless communication device 102.

Further, registration component 108 can be configured to communicate, based on the input from the subscriber, a request to provision wireless communication device 102 via core network 106, e.g., to a component of core network 106, for example, platform system 610 described below. Furthermore, registration component 108 can be configured to receive a condition, a stipulation, a qualification, a prerequisite, etc. associated with the request via the wireless network, e.g., from platform system 610. In an aspect, the condition, the stipulation, the qualification, the prerequisite, etc. can be associated with term(s) and/or condition(s) corresponding to the wireless service, e.g., for acceptance/rejection by the subscriber via an interface of wireless communication device 102.

In another aspect, interface component 110 can be configured to output a message including the condition, e.g., including text describing the term(s) and/or the condition(s) corresponding to the wireless service. In yet another aspect, interface component 110 can be configured to receive a second input from the subscriber based on the message, e.g., indicating an acceptance or a rejection of the term(s) and/or the condition(s). As such, registration component 108 can be configured to communicate information associated with the second input, e.g., the acceptance or the rejection, to a component, e.g., platform system 610, of core network 106.

In various aspects, core network 106 can include software and/or hardware configured to provide connectivity to/from/between wireless communication device 102. Communication environment 100 can include one or more: macro, Femto, or pico access points (APs) (not shown); base stations (BS) (not shown); landline networks (e.g., optical landline networks, electrical landline networks) (not shown) communicatively coupled between wireless communication device 102 and/or core network 106 to provide connectivity between wireless communication device 102 and core network 106. In various embodiments, wireless communication device 102 can communicate via any number of various types of wireless technologies including, but not limited to, cellular, WiFi, WiMax, wireless local area networks (WLAN), Femto, etc. In corresponding embodiments, core network 106 can provide cellular, WiFi, WiMAX, WLAN, and/or other technologies for facilitating such communication. Further, core network 106 can include one or more of the Internet (or another communication network (e.g., IP-based network)), or a digital subscriber line (DSL)-type or broadband network facilitated by Ethernet or other technology.

While only wireless communication device 102 is shown, in various embodiments, core network 106 can include, or can be communicatively coupled to, other communication devices inside or outside of communication environment 100. In various embodiments, communication environment 100 can include hardware and/or software for allocating resources to wireless communication device 102, e.g., converting or enforcing protocols, establishing and/or providing levels of Quality of Service (QoS), providing applications or services via core network 106, translating signals, and/or performing other desired functions to facilitate system interoperability and communication to or from wireless communication device 102.

Core network 106 can also include data store component(s), memory configured to store information, and/or computer-readable storage media storing computer-executable instructions enabling various operations performed via wireless communication device 102 and described herein. In some embodiments, core network 106 can include data store component(s), memory storing computer-executable instructions, and/or settings for initiating network provisioning of wireless communication device 102. In some embodiments, the data store component(s) can store settings, and/or the memory can store computer-executable instructions for enabling wireless communication device 102 to operate according to provisioning functions/operations as described in greater detail herein.

In various aspects, wireless communication device 102 can be a mobile, wireless, wireline, and/or optical device. Further, wireless communication device 102 can include, but is not limited to including, a mobile or cellular telephone including, but not limited to, a smartphone, a BLUETOOTH® enabled device, a 3GPP UMTS phone, a 4G cellular communication device, a personal digital assistant (PDA), computer, IP television (IPTV), a wireline phone with mobile messaging functionality, a gaming console, a set top box (STB), a multimedia recorder, a multimedia player, a video recorder, a video player, an audio recorder, an audio player, a laptop, a printer, a copier, or a scanner.

In various embodiments, wireless communication device 102 can include hardware and/or software facilitating operation according to one or more communication protocols described above with reference to core network 106, or the functionality facilitated by the hardware and/or software described above with reference to core network 106. The one or more communication protocols and/or the functionality can include, but is not limited to, MMS, SMS, WLAN, WiFi, WiMAX, BLUETOOTH® protocol, text messaging, electronic mail messaging, facsimile, multimedia and/or any number of other protocols or functionalities as described herein with reference to the communications protocols or functionalities facilitated by core network 106. In various embodiments, wireless communication device 102 can include hardware and/or software to facilitate transmitting and/or receiving messing traffic, e.g., which can include voice, text, digital pictures, video, audio, data traffic, etc. Further, the hardware and/or software can facilitate threading the messaging traffic, via a display associated with wireless communication device 102, according to an order that information associated with the messaging traffic is received by wireless communication device 102.

Figure 2:
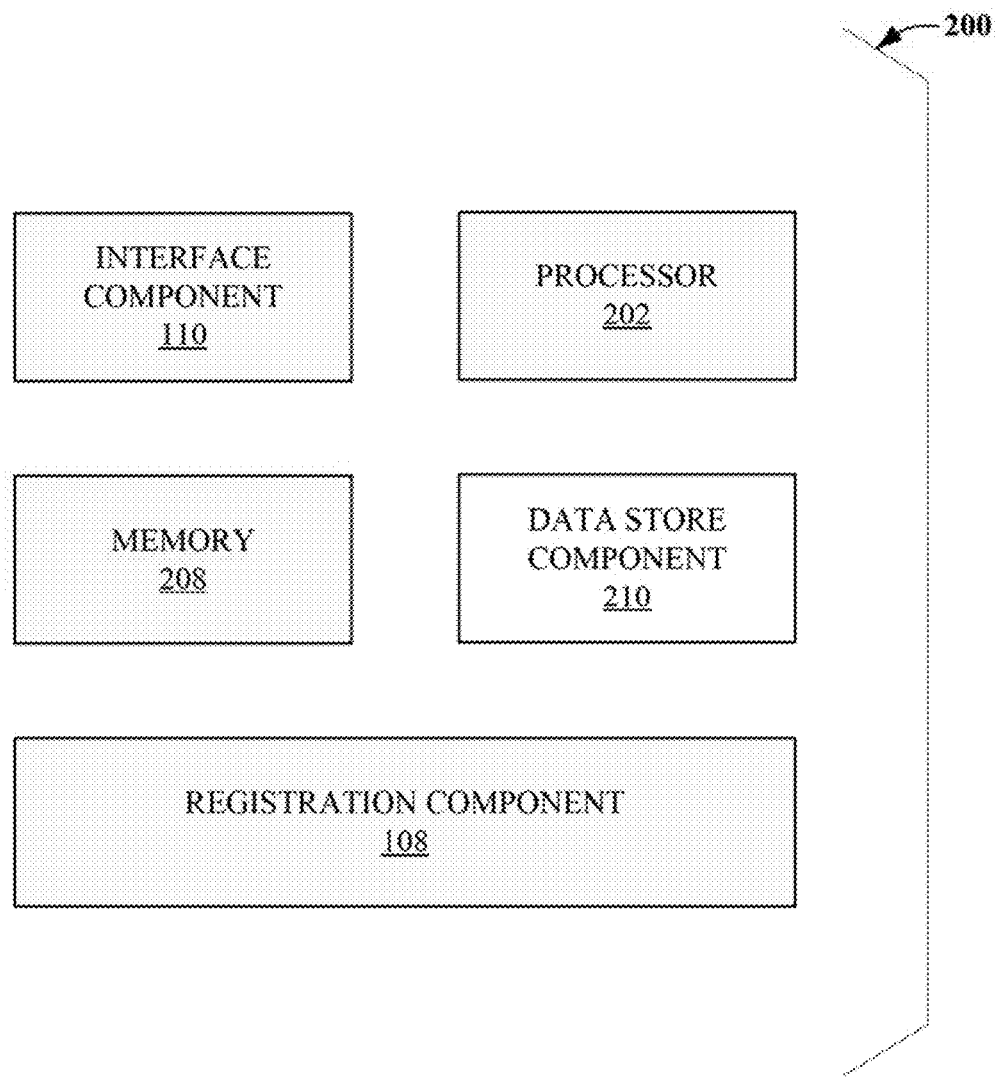
FIG. 2 illustrates a block diagram of a communication device, in accordance with various embodiments described herein.

Referring now to FIG. 2, a block diagram of a communication device 200 is illustrated, in accordance with various embodiments. Communication device 200 can include software, hardware, functionality, component(s), and/or structure(s) of wireless communication device 102 (and vice versa). Further, one or more components of communication device 200 can be communicatively coupled to one another to perform functions of communication device 200 described herein.

In an aspect, communication device 200 can include registration component 108, interface component 110, processor 202, memory 208, and data store component 210.

Interface component 110 can include hardware and/or software for facilitating receipt and/or output of information from/to a subscriber for initiating and performing network provisioning of wireless communication device 102.

Processor 202 can be configured to facilitate operations performed by one or more components of communication device 200, e.g., processor 202 can be included in, or communicatively coupled to, hardware and/or software of one or more components (not shown) of communication device 200 to facilitate subscriber initiated network provisioning of communication device 200 via communication device 200. Further, processor 202 can be communicatively coupled to such components for integrating messaging content, e.g., multimedia content, MMS message(s), SMS message(s), etc. within a thread of messaging content, e.g., conversation thread, etc. In some embodiments, processing for integrating such content can be initiated upon receiving such content at communication device 200.

Further, processor 202 can be included in, or communicatively coupled to, hardware and/or software of one or more components, e.g., registration component 108, to facilitate the subscriber initiated network provisioning of communication device 200.

Memory 208 and/or data store component 210 can be configured to store information, settings, and/or computer-executable instructions for performing one or more operations and/or functions described herein associated with communication device 200, e.g., methods 300-500 illustrated by FIGS. 3-5 and described below.

In various embodiments, data store component 210 can store data structure(s) (e.g., user data, application data, metadata); code structure(s) (e.g., modules, objects, classes, procedures); instructions; message hashes; neighbor cell lists; provisioning information, and/or display information, e.g., messaging content, associated with a UI display screen.

In an aspect, processor 206 can be functionally coupled, e.g., through a memory bus, to data store component 210 for: storing and retrieving information, e.g., neighbor cell list, information relating to provisioning communication device 200 via core network 106, other associated information, etc.; displaying information, e.g., term(s) and/or condition(s) associated with a wireless service, messaging content, etc. in the UI display screen; generating or displaying an overlay display region associated with the UI display screen; generating or processing notifications and associated notificationrelated information, e.g., frequency offsets, desired algorithms, etc. related to operating and/or conferring functionality to various components and/or operational aspects of communication device 200 including, e.g., registration component 108, interface component 110, etc.

In various embodiments, registration component 108 can implement one or more operations as described herein with reference to methods 300-500.

Figure 3:
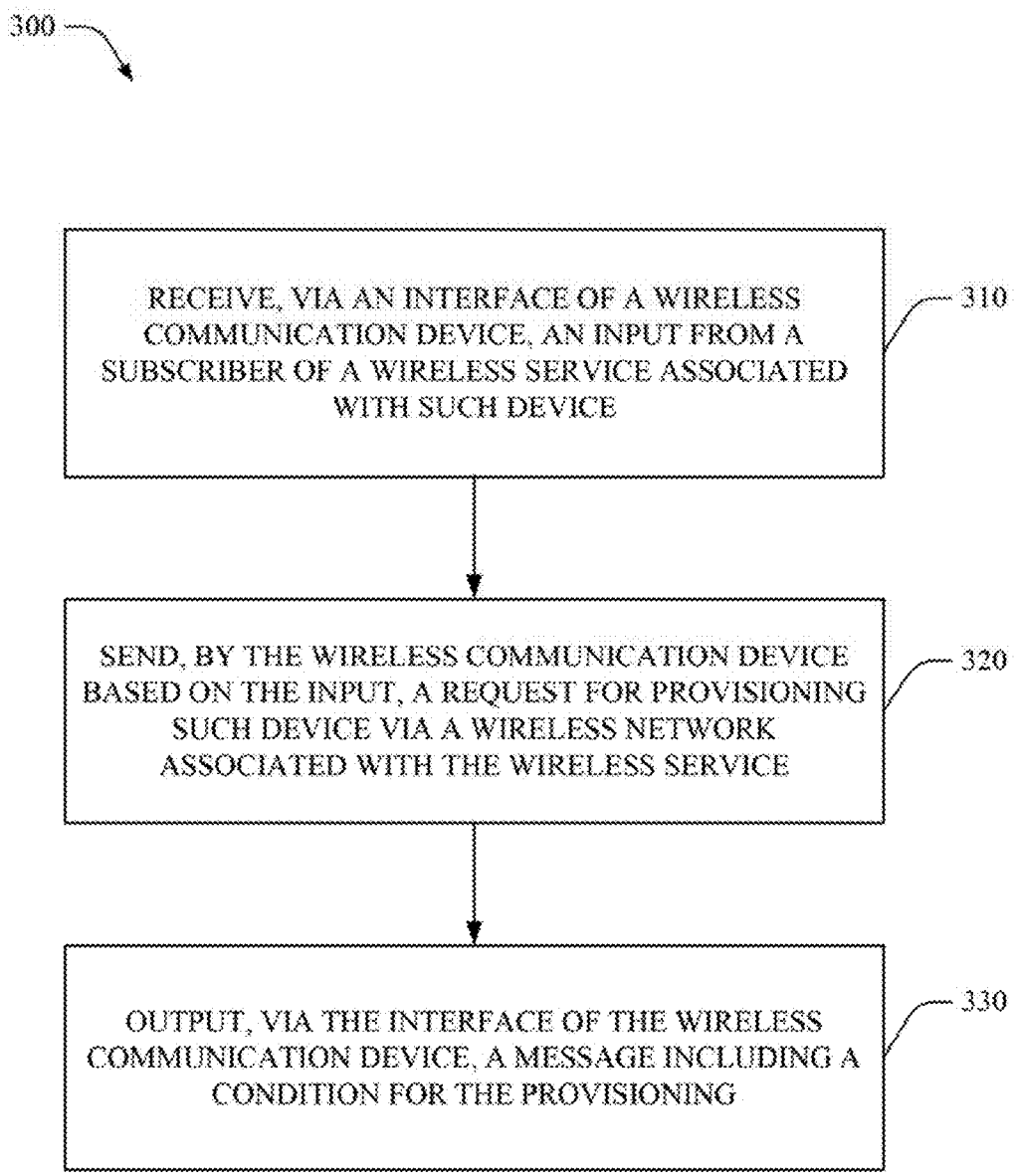
FIGS. 3-5 illustrate flowcharts of methods associated with provisioning a wireless communication device, in accordance with aspects described herein.

Referring now to FIG. 3, a method 300 for enabling a subscriber to initiate network provisioning of a wireless communication device (102) is illustrated, in accordance with various embodiments. At 310, an input from subscriber of a wireless service associated with the wireless communication device can be received, detected, etc. For example, the input can be detected based on the wireless communication device being powered up by the subscriber, e.g., after such device is purchased. At 320, the wireless communication device can send a request, based on the input, for provisioning the wireless communication device via a wireless network associated with the wireless service. At 330, a message including a condition, a stipulation, a qualification, a prerequisite, etc. that is related to term(s) and condition(s) associated with provisioning of the wireless service can be output by the wireless communication device, e.g., via interface component 110.

Figure 4:
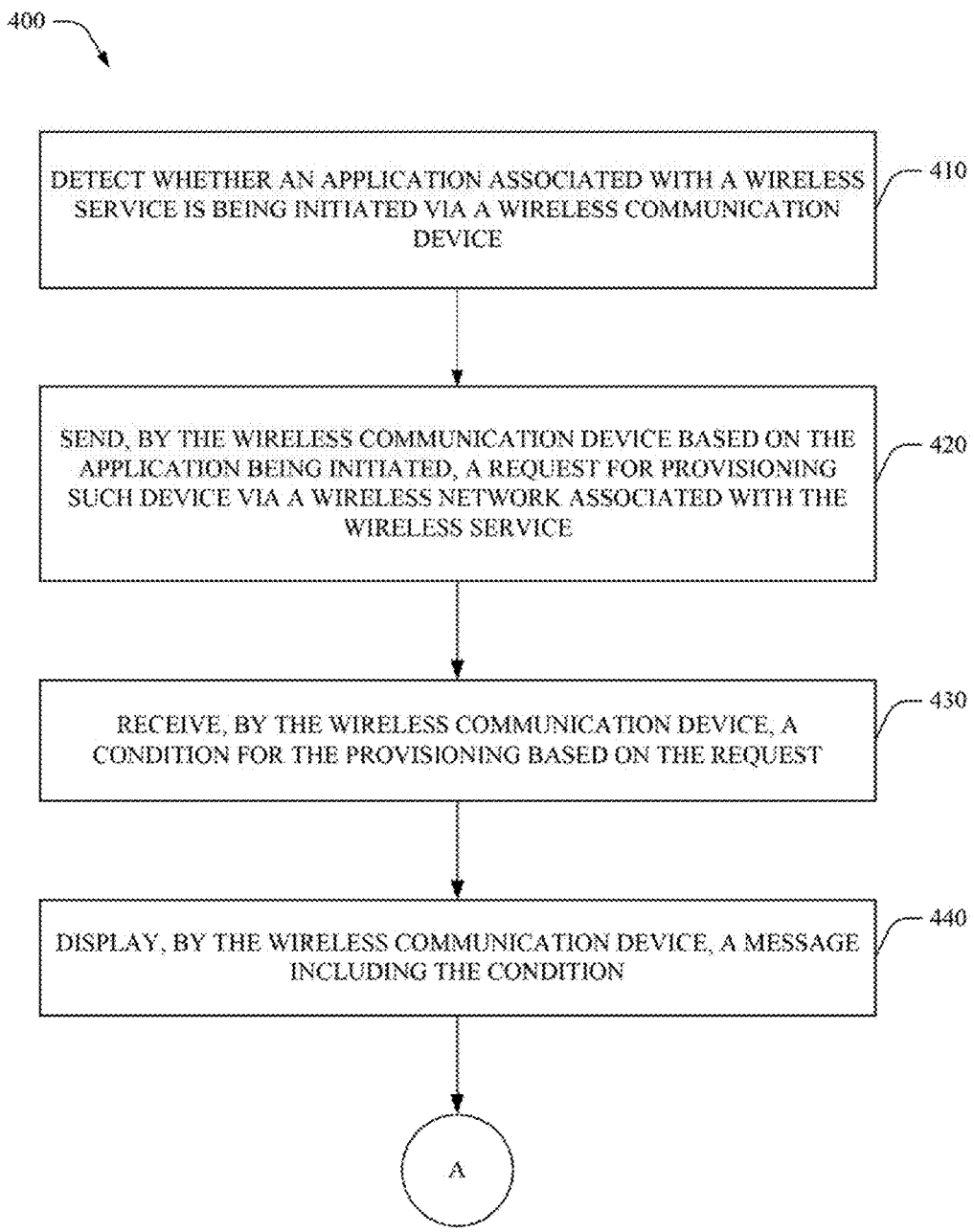
Figure 5:
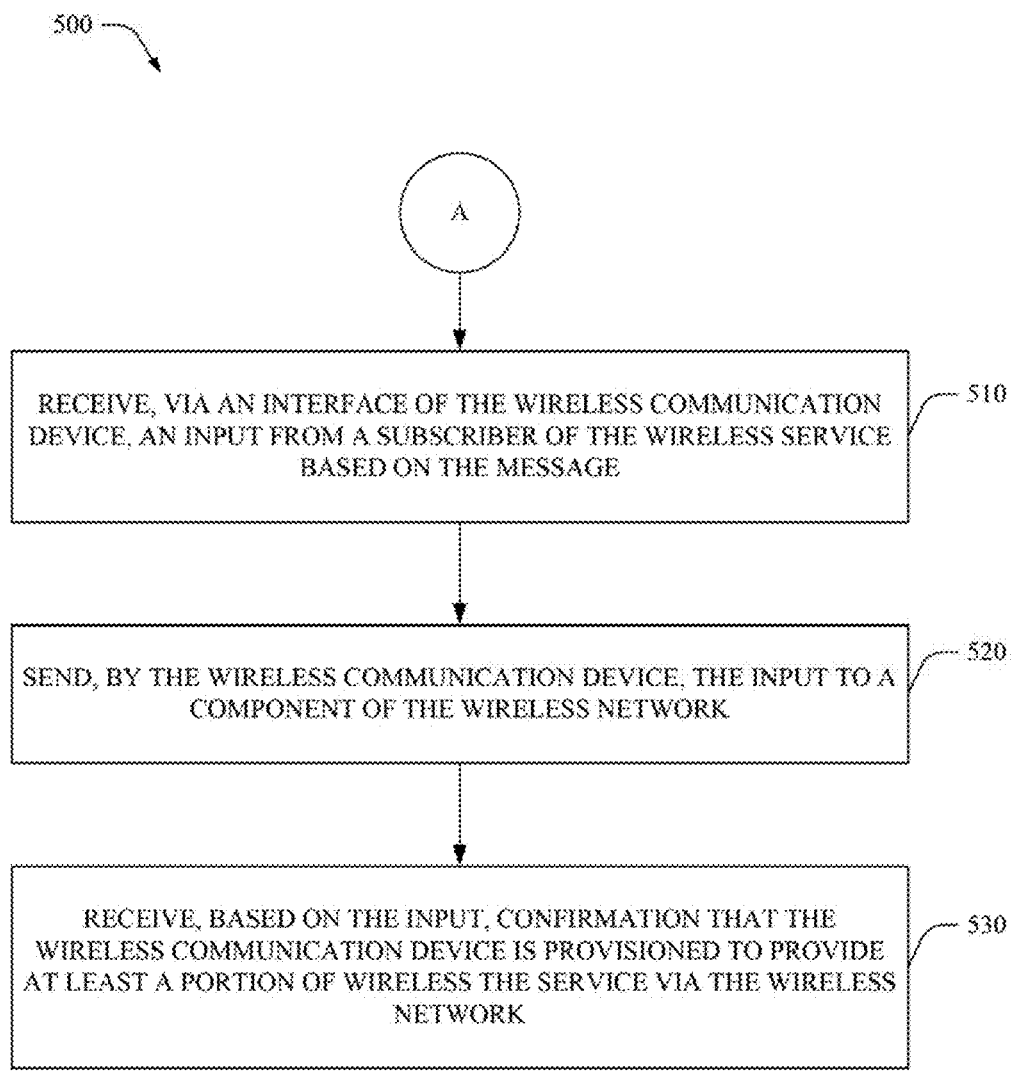

In another aspect illustrated by FIGS. 4 and 5, the input can be detected based on an application being initiated, started, etc. from the wireless communication device. For example, as illustrated by FIG. 4, the wireless communication device can detect, at 410, whether an application associated with a wireless service is being initiated, started, selected, etc. via the wireless communication device. As described above, the application can be a messaging application. At 420, the wireless communication device can send, based on the application being initiated, a request for provisioning the wireless communication device via a wireless network associated with the wireless service. At 430, the wireless communication device can receive, based on the request, e.g., via platform system 610 described below, a condition, a stipulation, a qualification, a prerequisite, etc. for the provisioning, e.g., term(s) and/or condition(s) associated with the subscriber being provided the wireless service via the wireless communication device. At 440, the wireless communication device can display, e.g., via interface component 110, a message including, indicating, describing, etc. the condition.

Now referring to FIG. 5, flow can continue from 440 to 510, at which an input from the subscriber can be received, based on the message, via an interface, e.g., associated with interface component 110, of the wireless communication device. In an aspect, the input can indicate the condition, the stipulation, the qualification, the prerequisite, etc. being accepted or denied by the subscriber. At 520, the wireless communication device can send the input to a component, e.g., platform 620 described below, of the wireless network.

At 530, the wireless communication device can receive, based on the input, confirmation, information, data, etc. associated with the wireless communication device being provisioned via the wireless network. For example, the wireless communication device can be provisioned, configured, etc. to provide at least a portion of the wireless service via the wireless network.

Figure 6:
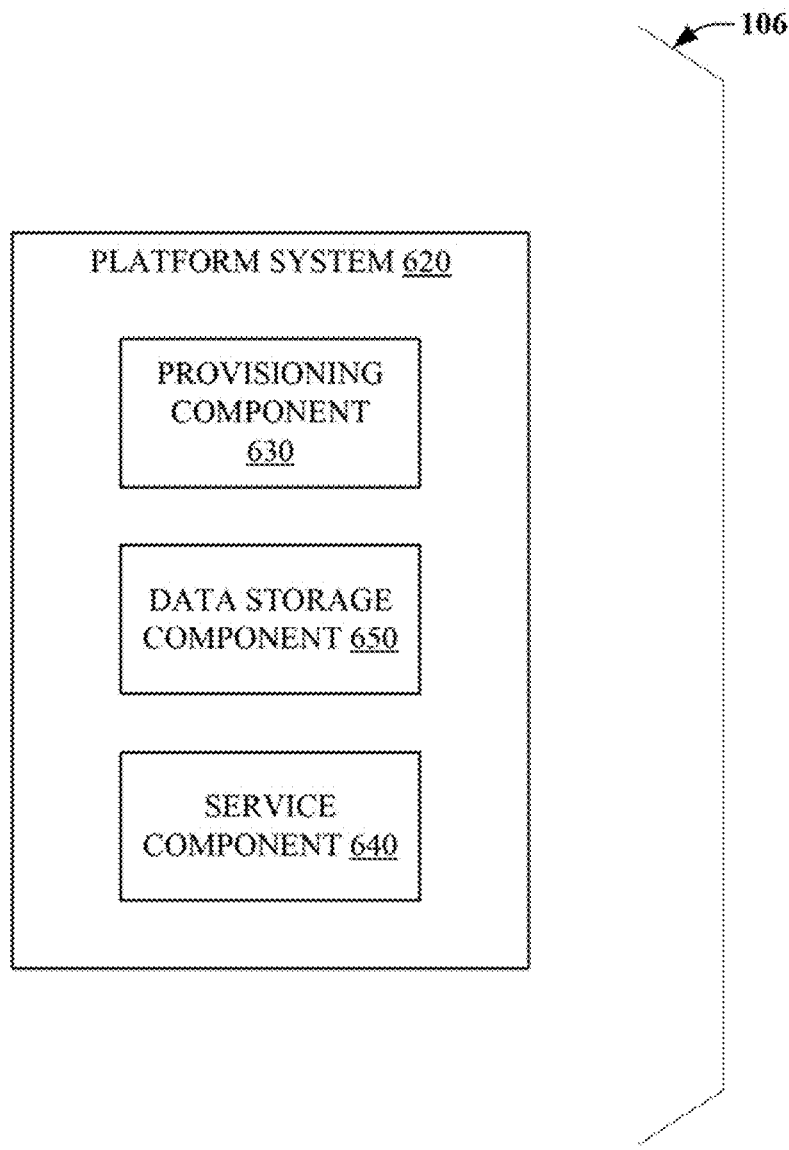
FIG. 6 illustrates a block diagram of another communication environment, in accordance with various embodiments described herein.

FIG. 6 illustrates a communication environment including a platform system 610 is illustrated, in accordance with an embodiment. As illustrated by FIG. 6, one or more components, e.g., hardware and/or software, etc. of service platform system 610 can be included in and/or provided by core network 106.

Platform system 610 can include a provisioning component 620, a data storage component 630, and a service component 640. In an aspect, data storage component 630 can be configured to store, via a data storage device, information associated with a subscriber of a wireless service that is associated with a wireless network. In one aspect, the information can include data indicating term(s) and/or condition(s) associated with the wireless service being accepted/denied by the subscriber.

In various embodiments, provisioning component 620 can implement one or more operations as described herein with reference to methods 800-900.

Figure 8:
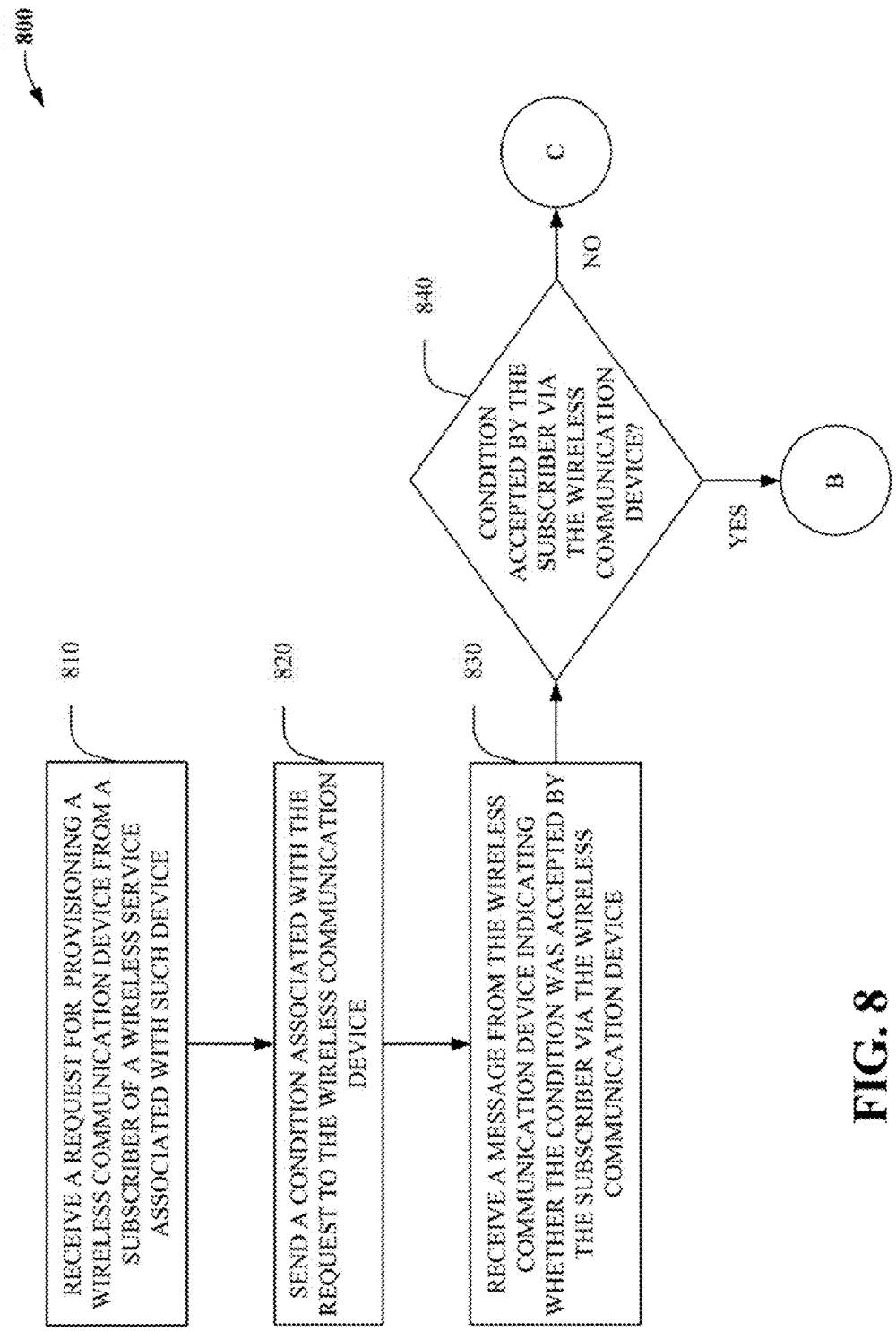
FIGS. 8-9 illustrate flowcharts of other methods associated with provisioning a wireless communication device, in accordance with aspects described herein.

Referring now to FIG. 8, another method 800 for enabling a subscriber to initiate network provisioning of a wireless communication device (102) is illustrated, in accordance with various embodiments. At 810, a request for provisioning the wireless communication device can be received, e.g., via provisioning component 620, from the subscriber by way of the wireless communication device, e.g., to enable the wireless communication device to perform operations associated with the wireless service via the wireless network At 820, a condition, a stipulation, a qualification, a prerequisite, etc. associated with the request can be sent, e.g., via provisioning component 620, to the wireless communication device. For example, the condition, the stipulation, the qualification, the prerequisite, etc. can be included in a message including at least one of the term(s) or the condition(s) associated with the wireless service, e.g., for acceptance by the subscriber via the wireless communication device.

At 830, a message sent by the wireless communication device can be received, e.g., via provisioning component 620, indicating whether the condition, the stipulation, the qualification, the prerequisite, etc. was accepted by the subscriber via the wireless communication device.

At 840, process 800, e.g., via provisioning component 620, can determine, based on the message, whether the condition, the stipulation, the qualification, the prerequisite, etc. was accepted by the subscriber via the wireless communication device.

Figure 9:
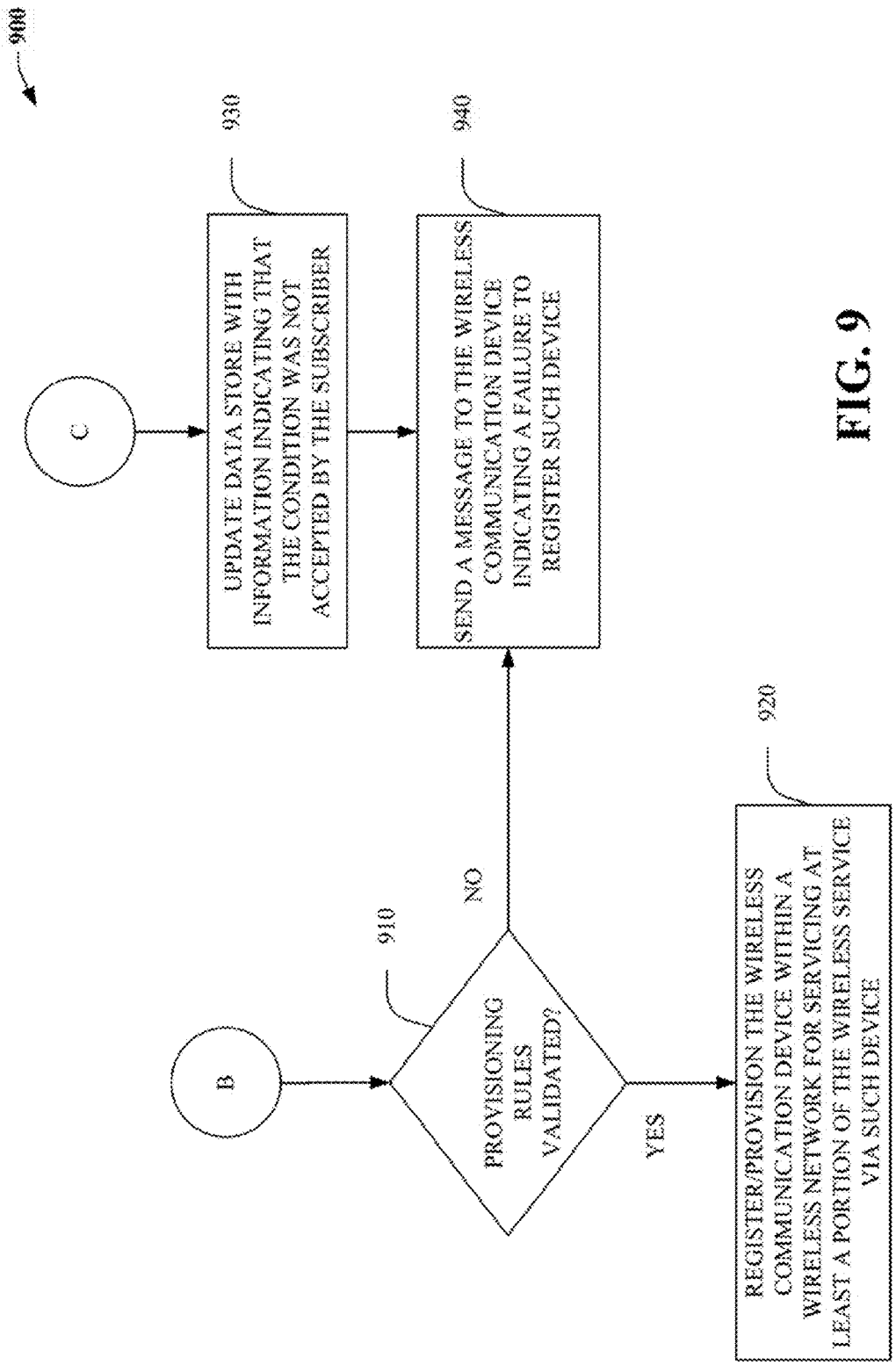

Now referring to FIG. 9, if process 800 determines that the condition, the stipulation, the qualification, the prerequisite, etc. was accepted by the subscriber, flow continues from 840 to 910; otherwise flow continues from 840 to 930, at which process 900 can modify, update, etc. (e.g., via data storage component 630) the information associated with the subscriber, e.g., indicating that the condition, the stipulation, the qualification, the prerequisite, etc. was not accepted by the subscriber. As such, at 940, process 900 can send a message to the wireless communication device indicating a failure to register, provision, etc. the wireless communication device via the wireless network. In an aspect, the wireless communication device can display the message, or related information, via interface component 110, e.g., the wireless communication device can indicate that the subscriber can call customer service to attempt to resolve the provisioning.

At 910, process 900, e.g., via provisioning component 620, can validate one or more rules, conditions, etc. for provisioning the wireless communication device via the wireless network. For example, provisioning component 620 can evaluate, determine, etc. whether at least one of the following conditions is satisfied: (1) the subscriber is active, e.g., the subscriber is a valid customer associated with a provider of the wireless service; (2) a phone number associated with the request is not portable, or ported, via a type 1 interconnection, e.g., supporting traffic between a wireless carrier switch and a PSTN; or (3) an account associated with the subscriber and Customized Applications for Mobile networks Enhanced Logic (CAMEL) based service(s) does not conflict with the wireless service.

If process 900 determines that one or more of the conditions have not been satisfied, validated, etc. then process 900 can flow to 940 (see above); otherwise, process 900 can continue to 920, at which process 900 can register, provision, etc. the wireless communication device within the wireless network, e.g., for servicing at least a portion of the wireless service via the wireless communication device.

Figure 7:
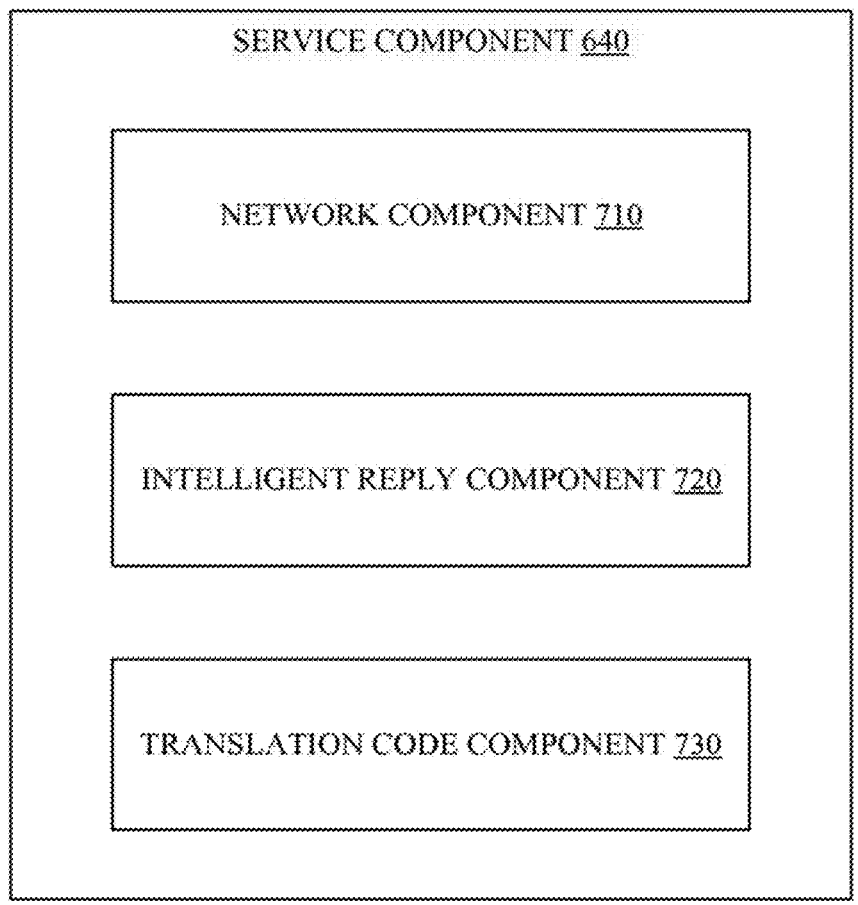
FIG. 7 illustrates a block diagram of a service component, in accordance with aspects described herein.

Referring now to FIG. 7, in one or more aspects, service component 640 can include a network component 710, an intelligent reply component 720, and a translation component 730. As such, service component 640 can be configured to provide at least a portion of the wireless service via the wireless communication device, e.g., 102, based on the message.

In an aspect, the portion of the wireless service includes a transfer of messaging content to/from the wireless communication device, e.g., to be displayed by the wireless communication device, for example, as threaded messages that are displayed based on a time such messages are sent/received from/at the wireless communication device.

Network component 710 can be configured to assign a phone number to communication devices including the wireless communication device. Further, service component 640 can be configured to provide the portion of the wireless service via the respective communication devices based on the phone number. As such, network component 710 can provision the phone number as a master number for numerous different communication devices.

In an aspect, service component 640 can be configured to provide the portion of the wireless service via an internet based interface of a device of the respective communication devices, e.g., via a network based interface, a web-browser, etc.

Intelligent reply component 720 can be configured to detect a missed call associated with the phone number. Further, intelligent reply component 720 can be configured to route a return call to a device of the communication devices based on a parameter associated with the missed call. In an aspect, the parameter can include a time of day, a day of week, a location of a destination/device, a present status of the destination/device, etc. As such, intelligent reply component 720 can determine which device a called device should reply.

For example, if a first device detects a missed call from the phone number that is assigned to the respective communication devices, intelligent reply component 720 can enable the first device to determine which device of the respective communication devices to return the missed call.

Translation component 730 can be configured to route a communication, based on the wireless service, from the wireless communication device to an other communication device utilizing a short code associated with the communication, for example, via a web-based interface. As such, translation component 730 can enable sending and receiving, via the internet, communications associated with wireless communication devices.

Figure 10:
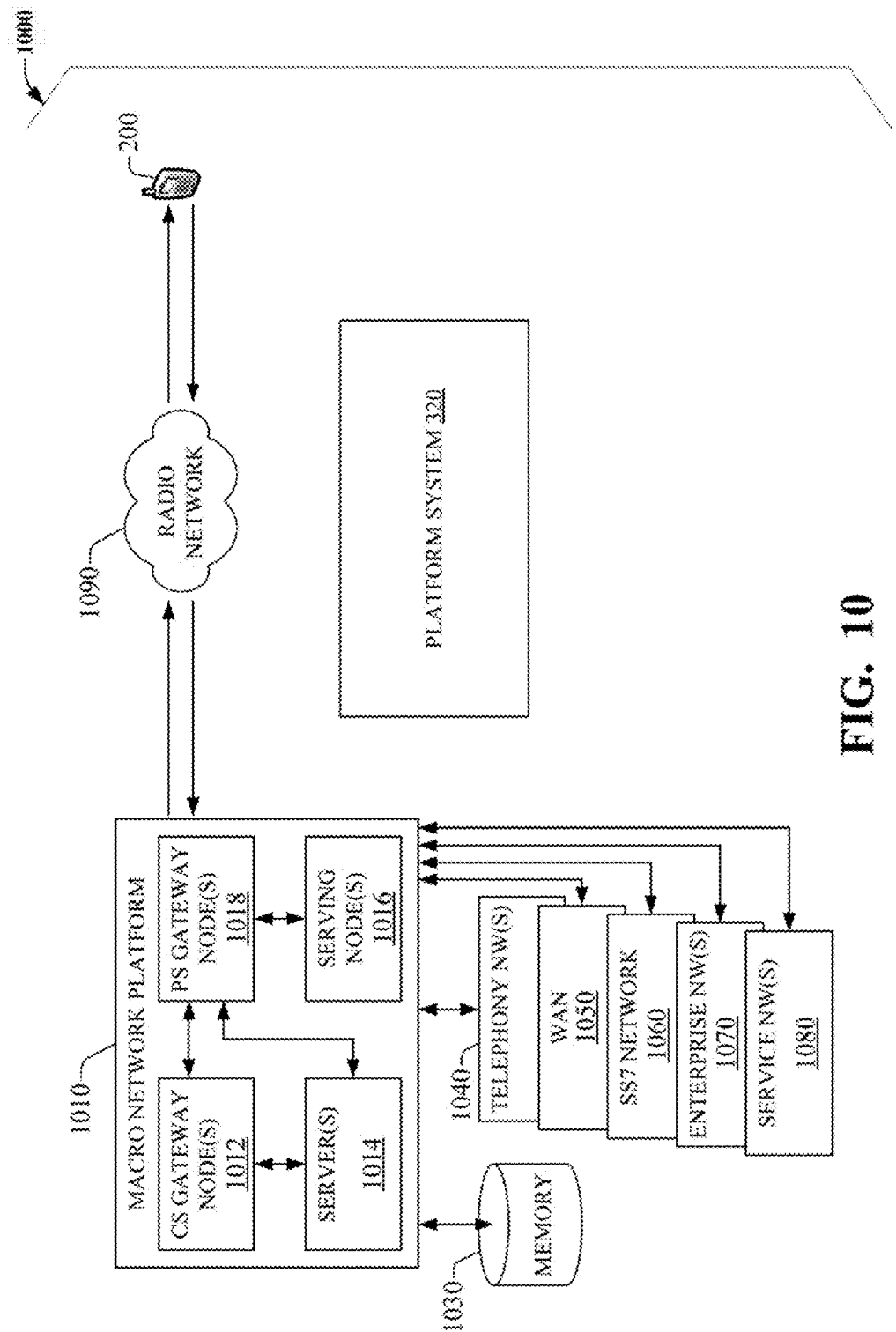
FIG. 10 illustrates a wireless communication environment, in accordance with aspects described herein.

With respect to FIG. 10, a wireless communication environment 1000 including communication device 200, platform system 320, and macro network platform 1010 is illustrated, in accordance with an embodiment. Macro network platform 1010 serves or facilitates communication with communication device 200 via radio network 1090. It should be appreciated that in cellular wireless technologies that can be associated with radio network 1090 (e.g., 3GPP UMTS, HSPA, 3GPP LTE, 3GPP2 UMB), macro network platform 1010 is embodied in a core network, e.g., 106. It is noted that radio network 1090 can include base station(s), base transceiver station(s), or access point(s), and associated electronic circuitry and deployment site(s), in addition to a wireless radio link operated in accordance with the base station(s). Accordingly, radio network 1090 can comprise various coverage cells, or wireless coverage areas. In addition, it should be appreciated that elements and/or components of platform system 320 can be located/included within one or more components/elements, e.g., hardware, software, etc., of wireless communication environment 1000, e.g., macro network platform 1010, radio network 1090, etc.

Generally, macro platform 1010 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication, e.g., via communication device 200. In an aspect of the subject innovation, macro network platform 1010 includes CS gateway node(s) 1012 which can interface CS traffic received from legacy networks like telephony network(s) 1040, e.g., public switched telephone network (PSTN), or public land mobile network (PLMN), or a SS7 network 1060. Circuit switched gateway 1012 can authorize and authenticate traffic, e.g., voice, arising from such networks. Additionally, CS gateway 1012 can access mobility or roaming data generated through SS7 network 1060; for instance, mobility data stored in a visitor location register (VLR), which can reside in memory 1030. Moreover, CS gateway node(s) 1012 interfaces CS-based traffic and signaling and gateway node(s) 1018. As an example, in a 3GPP UMTS network, PS gateway node(s) 1018 can be embodied in gateway GPRS support node(s) (GGSN).

In addition to receiving and processing CS-switched traffic and signaling, PS gateway node(s) 1018 can authorize and authenticate PS-based data sessions with served, e.g., through macro RAN, wireless devices. Data sessions can include traffic exchange with networks external to the macro network platform 1010, like wide area network(s) (WANs) 1050; enterprise networks (NWs) 1070, e.g., enhanced 911, or service NW(s) 1080 like IP multimedia subsystem (IMS). It should be appreciated that local area network(s) (LANs), which may be a part of enterprise NW(s), can also be interfaced with macro network platform 1010 through PS gateway node(s) 1018. Packet-switched gateway node(s) 1018 generates packet data contexts when a data session is established. To that end, in an aspect, PS gateway node(s) 1018 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1014. It is to be noted that in 3GPP UMTS network(s), PS gateway node(s) 1018 (e.g., GGSN) and tunnel interface (e.g., TTG) comprise a packet data gateway (PDG).

Macro network platform 1010 also includes serving node(s) 1016 that can convey the various packetized flows of information, or data streams, received through PS gateway node(s) 1018. As an example, in a 3GPP UMTS network, serving node(s) can be embodied in serving GPRS support node(s) (SGSN).

As indicated above, server(s) 1014 in macro network platform 1010 can execute numerous applications, e.g., messaging, location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 1010. Data streams can be conveyed to PS gateway node(s) 1018 for authorization/authentication and initiation of a data session, and to serving node(s) 1016 for communication thereafter. Server(s) 1014 can also effect security, e.g., implement one or more firewalls, of macro network platform 1010 to ensure network's operation and data integrity in addition to authorization and authentication procedures that CS gateway node(s) 1012 and PS gateway node(s) 1018 can enact. Moreover, server(s) 1014 can provision services from external network(s), e.g., WAN 1050, or Global Positioning System (GPS) network(s), which can be a part of enterprise NW(s) 1080. It is to be noted that server(s) 1014 can include one or more processors configured to confer at least in part the functionality of macro network platform 1010. To that end, the one or more processors can execute code instructions stored in memory 1030, for example.

In example wireless communication environment 1000, memory 1030 stores information, e.g., provisioning information (see above), related to operation of macro network platform 1010 and communication device 200. Information can include business data associated with subscribers; market plans and strategies, e.g., promotional campaigns, business partnerships; operational data for mobile devices served through macro network platform; service and privacy policies; end-user service logs for law enforcement; term(s) and/or condition(s) associated with wireless service(s) provided via radio network 1090; and so forth. Memory 1030 can also store information from at least one of telephony network(s) 1040, WAN 1050, SS7 network 1060, enterprise NW(s) 1070, or service NW(s) 1080.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1030, non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
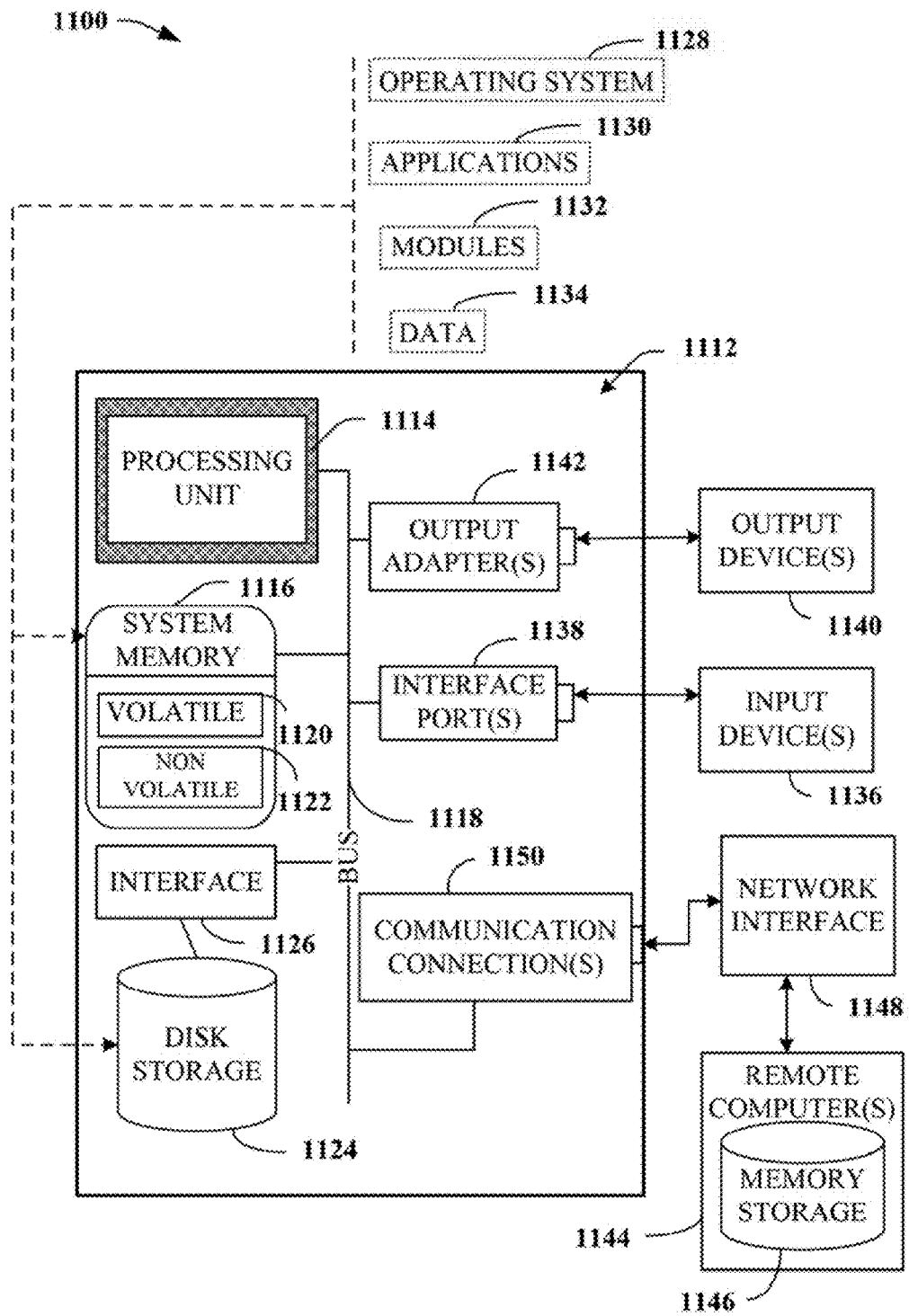
FIG. 11 illustrates a block diagram of a computing system operable to execute the disclosed methods and apparatus, in accordance with aspects described herein.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information, e.g., via interface component 830, into computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1114 through system bus 1118 via interface port(s) 1138. Interface port(s) 1138 include, for example, a serial port, a parallel port, a game port, and a universal serial bus (USB). Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refer(s) to hardware/ software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The computer 1112 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 710 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and BLUETOOTH® wireless technologies. Thus, the communication can be a predefined structure as with a conventional network or simply an ad hoc communication between at least two devices.

WiFi allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11(a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a wireless communication device including a processor, a first input associated with a subscriber of a wireless service, wherein the subscriber is a valid customer associated with a provider of the wireless service;
sending, by the wireless communication device via a wireless access point based on the first input, a request for provisioning the wireless communication device via the wireless access point;
receiving, by the wireless communication device via the wireless access point based on the request, a condition corresponding to the wireless service for provisioning of the wireless communication device via the wireless access point;
displaying, by the wireless communication device, a first message including text that represents the condition corresponding to the wireless service for the provisioning of the wireless communication device via the wireless access point;
in response to the displaying of the first message, receiving, by the wireless communication device, a second input associated with the subscriber of the wireless service that represents whether the condition has been accepted;
sending, by the wireless communication device via the wireless access point based on the second input, information directed to a component associated with the wireless access point; and
in response to an indication that the information represents the condition has been accepted, receiving, by the wireless communication device via the wireless access point, data representing the wireless communication device has been provisioned via the wireless access point to facilitate access to the wireless service.

2. The method of claim 1, further comprising:
detecting, by the wireless communication device, whether an application associated with the wireless service has been initiated.

3. The method of claim 1, wherein the receiving the condition further comprises receiving, by the wireless communication device, the condition from a component of a wireless network associated with the wireless service.

4. The method of claim 1, further comprising:
facilitating, by the wireless communication device, a performance of a portion of the wireless service based on the data.

5. The method of claim 4, further comprising:
displaying, by the wireless communication device, messaging content associated with the wireless service.

6. A system, comprising:
a memory that stores computer-executable instructions; and
a processor, communicatively coupled to the memory, that facilitates execution of the computer-executable instructions to at least:
store, via a data storage device, information associated with a subscriber of a wireless service that is associated with a wireless access point, wherein the subscriber is a valid customer associated with a provider of the wireless service;
receive, from a wireless communication device associated with the subscriber, a request to facilitate a configuration of the wireless communication device via the wireless access point based on the information;
send, via the wireless access point based on the request, a communication directed to the wireless communication device including text that represents a stipulation associated with the wireless service to facilitate the configuration of the wireless communication device;
receive, via the wireless access point based on the communication, a message from the wireless communication device that represents whether the stipulation has been accepted;
determine, based on the message, whether the stipulation has been accepted; and
in response to a determination that the stipulation has been accepted, send, via the wireless access point, data directed to the wireless communication device representing the wireless communication device has been configured to access the wireless service.

7. The system of claim of claim 6, wherein the at least one processor further facilitates the execution of the computer-executable instructions to:
modify the information based on the message.

8. The system of claim 6, wherein the at least one processor further facilitates the execution of the computer-executable instructions to:
provide a portion of the wireless service via the wireless communication device based on the message.

9. The system of claim 6, wherein the at least one processor further facilitates the execution of the computer-executable instructions to:
send messaging content directed to the wireless communication device.

10. The system of claim 6, wherein the at least one processor further facilitates the execution of the computer-executable instructions to:
assign a phone number to communication devices including the wireless communication device; and
provide a portion of the wireless service via the communication devices based on the phone number.

11. The system of claim 10, wherein the at least one processor further facilitates the execution of the computer-executable instructions to:
provide the portion of the wireless service via an internet based interface of a device of the communication devices.

12. The system of claim 10, wherein the at least one processor further facilitates the execution of the computer-executable instructions to:
detect a missed call associated with the phone number; and
route a return call to a device of the communication devices based on a parameter associated with the missed call.

13. The system of claim 6, wherein the at least one processor further facilitates the execution of the computer-executable instructions to:

route another communication from the wireless communication device to a communication device utilizing a short code.

14. A non-transitory computer-readable storage medium comprising computer executable instructions that, in response to execution, cause a computing system including a processor to perform operations, comprising:

receiving, via an interface of an apparatus, a first input corresponding to a subscriber of a wireless service associated with a wireless network, wherein the subscriber is a valid customer associated with a provider of the wireless service;

communicating, by the apparatus via the wireless network based on the input, a request to provision the apparatus via the wireless network;

receiving, by the apparatus via the wireless network based on the request, a qualification associated with the wireless service as a condition for facilitating provisioning of the apparatus request via the wireless network;

displaying, via the interface, text that indicates the qualification;

receiving, via the interface in response to the displaying the text, a second input representing the condition has been accepted by the subscriber;

communicating, by the apparatus via the wireless network based on the second input, a message directed to a component of the wireless network; and receiving, by the apparatus via the wireless network based on the message, information representing the apparatus has been provisioned to facilitate access to the wireless service.

15. The non-transitory computer-readable storage medium of claim 14, wherein the operations further comprise:

detecting, by the apparatus, whether an application associated with the wireless service has been initiated.

16. The non-transitory computer-readable storage medium of claim 14, wherein the receiving the qualification further comprises receiving, by the apparatus via the wireless network, the qualification from a component of the wireless network.

17. The non-transitory computer-readable storage medium of claim 14, wherein the operations further comprise:

facilitating, by the apparatus, a performance of a portion of the wireless service based on the information.

18. The non-transitory computer-readable storage medium of claim 14, wherein the operations further comprise:

displaying, by the apparatus, messaging content associated with the wireless service.

19. The non-transitory computer-readable storage medium of claim 14, wherein the operations further comprise:

in response to the message representing denial of the condition by the subscriber, receiving, by the apparatus, a message associated with a customer service.

20. The non-transitory computer-readable storage medium of claim 19, wherein the operations further comprise:

displaying, by the apparatus based on the message, text requesting the subscriber call a representative associated with the customer service.

\* \* \* \* \*